United States Patent Office 3,666,445
Patented May 30, 1972

3,666,445
AUXILIARY COMPOSITION FOR STEEL-MAKING FURNACES
Joseph K. Stone and Peter J. Beck, Berkeley, and Edward J. Prince, Oakland, Calif., assignors to Kaiser Industries Corporation, Oakland, Calif.
No Drawing. Original application Dec. 26, 1967, Ser. No. 693,123, now Patent No. 3,579,325, dated May 18, 1971. Divided and this application July 13, 1970, Ser. No. 61,038
Int. Cl. C21c 7/00
U.S. Cl. 75—94                                    10 Claims

ABSTRACT OF THE DISCLOSURE

A composition for charging to a metallurgical furnace, such as an oxygen steel furnace which is a heat- and flux-producing agent consisting essentially of a granular admixture of from 5% to 95% calcium carbide and from 95% to 5% silicon carbide. Both components provide fuel to enable the use of higher amounts of scrap metal; and in one embodiment the silicon carbide and calcium carbide are admixed in a ratio to give an eventual slag of suitable lime-silica ratio. The admixture of silicon carbide and calcium carbide is advantageously admixed with a minor amount of a hydrocarbon bonding agent which is at least semi-solid at ordinary room temperatures, such as tar or pitch, and formed into compacts, e.g. pellets or briquettes. Powdered aluminum metal can also be incorporated.

CROSS-REFERENCE TO RELATED APPLICATION

This application is a division of application Ser. No. 693,123, filed Dec. 26, 1967, now United States Pat. 3,579,325, issued May 18, 1971.

BACKGROUND OF THE INVENTION

This invention relates to an adjuvant or composition particularly suited for introduction into an oxygen steel converter, e.g. such as is operated in the L–D process for refining iron; and to a method of operating a steel-making furnace with the aid of such adjuvant, which enables the use of larger-than-usual amounts of scrap per charge to the furnace.

In the oxygen steel process, as is well known, hot metal and an amount of scrap metal are charged to a refractory-lined converter and there are also charged thereto slag-forming ingredients such as fluorspar, bauxite, lime or limestone or both, and if desired, other ingredients to combine with oxidized impurities in the iron and form a basic slag. Hitherto, the amount of scrap metal has been necessarily limited in this process to about 25% to 30% of the metallic charge, i.e. the total hot metal plus scrap, in order to maintain the required thermal balance in an autogeneous steel-making operation, that is, where there is no external heat source. Various means have been proposed for enabling a higher-than-usual incorporation of scrap in such furnaces. These methods have included preheating the scrap prior to its charging into the furnace, charging superheated hot metal thereto or other means, all of which have required separate equipment, separate steps and separate handling of these very hot components of the basic oxygen furnace charge. On the other hand, the incorporation of calcium carbide as a fuel source for oxygen furnaces has also been proposed but has met with various difficulties. For instance, the charging of lumps of calcium carbide of sufficient size to avoid blowing out of the furnace has proved inefficient, apparently because calcium carbide is of relatively slow solubility in the hot metal wherein its use has been proposed. On the other hand, where a finely divided calcium carbide, in small enough particle size to enhance its solubility in the molten metal, has been tried, it has required blowing into the furnace, or blowing beneath the surface of the metal, by means of a separate lance arrangement, which again has been expensive. Calcium carbide is also sensitive to moisture and in contact therewith tends to decompose forming acetylene which is a flammable and explosive gas and calcium hydroxide which is caustic, so that this carbide must be shielded in storage and handling from attack by water or water vapor. Also, due to its slow rate of solution in the molten iron charge, foaming slags tend to occur which mask the endpoint of the oxygen steel operation.

BRIEF DESCRIPTION OF THE INVENTION

According to the present invention, the above disadvantages are overcome and other advantages are obtained, as will be described in more detail below, by incorporating in the basic oxygen furnace feed an admixture of silicon carbide and calcium carbide in suitable containers or in compacted form, the calcium carbide being present suitably in particle sizes of less than ¼ inch diameter; and silicon carbide being suitably employed in coarser sizes, for example in sizes of less than a half-inch in diameter. In such an admixture the calcium carbide is in such physical state as to enhance its solubility in the molten metal and to utilize to the greatest extent its fuel value as derived from the oxidation of both the carbon and the calcium components of the compound; and on the other hand, the fuel value of silicon carbide from oxidation of the components thereof is also advantageously utilized. Furthermore, the calcium oxide and the silicon dioxide which are formed by oxidation during the steel-making process provide slag-forming components during operation to the furnace and are compatible with other normal components of the molten metal environment.

DETAILED DESCRIPTION OF THE INVENTION

In the present invention there is provided a charge or feed composition for the basic oxygen furnace which provides fuel and flux components and which comprises a granular admixture of, based on the weight of the two carbides, from 5% to 95% of silicon carbide and from 95% to 5% calcium carbide. In one suitable embodiment of the present invention there is employed one part of silicon carbide and from 1 to 10 parts by weight of calcium carbide; and in an especially advantageous embodiment these components are employed in the normal slag-forming ratios, that is about 1 part of silicon carbide and about 5 parts of calcium carbide, this self-fluxing admixture being adapted to form during the oxygen furnace reaction a slag having a 3:1 basicity ratio, i.e. about $3CaO \cdot 1SiO_2$. Suitably the average particle size of the calcium carbide is less than that of the silicon carbide.

In one embodiment the admixture of silicon carbide and calcium carbide as described herein is thoroughly intermixed to obtain the uniform material and this is introduced into the oxygen furnace in suitable containers, such as steel sheet cans, or combustible containers. In another embodiment the silicon carbide and calcium carbide in the proportions described above are thoroughly intermixed and to this admixture is added a minor amount, sufficient to bond the particles, based on the total weight of the mix, and suitably from about 2% to 20%, of a water-resistant hydrocarbon bonding agent which is at least semi-solid at ordinary room temperature, and is suitably a cokable carbonaceous composition such as tar or pitch, especially as derived from destructive distillation of coal; and the whole is then formed into compacts such as pellets or briquettes.

In one method of carrying out the present invention, an admixture of silicon carbide and calcium carbide as described above is packaged in a suitable container, e.g. a steel sheet can, which will be destroyed during the furnace operation and will not provide any substantial amount of deleterious components, and is fed into the basic oxygen converter or furnace along with or subsequently to charging the scrap metal after which hot metal is charged to the furnace and oxygen is introduced by blowing from above as in the ordinary L–D operation. Thereafter the usual fluxes can be added in the known way in amounts to supplement the lime derived from the calcium carbide. The blow continues in the usual way until the flame drops, whereupon the metal is withdrawn.

In one mode of carrying out the present invention, the desired admixture of silicon carbide and calcium carbide, for instance, from about 30% to about 70% calcium carbide in particle sizes less than ¼ inch in diameter and from 70% to 30% of silicon carbide of less than ½ inch in diameter is thoroughly and intimately blended and there is intimately admixed with such admixture tar or pitch in an amount of from 3% to 10% by weight based on the total weight of the batch, and the whole then briquetted to form strong compacts. In this manner, the cokable carbonaceous bonding agent protects the finely divided calcium carbide from attack by moisture or water which would result in decomposition into calcium hydroxide and acetylene gas.

In another and advantageous mode of procedure, hydrocarbon bonding agent, especially coal tar or coal tar pitch, and the silicon carbide particles are separately heated to 200°–300° F., then mixed together and thereafter unheated calcium carbide fines are mixed in, the whole compacted into shapes and cooled to ambient temperature. The finished compacts can also be dipped, coated, sprayed or the like with a hydrocarbon bonding agent of the type described herein and, if desired, with incorporation of a portion of the silicon carbide, to protect the calcium carbide further from water attack.

The compacts are easily stored and shipped and in furnace operation are charged into the furnace as described above. The compacts are suitably well distributed over the cross section of the furnace and hot metal is then charged thereto, whereupon the compacts are uniformly distributed throughout the cross section of the charge of hot metal and the carbide components are uniformly available for reaction therein.

In carrying out the oxygen steel-making process using the carbide adjuvant according to the present invention, the amount of scrap which can be added is substantially increased above the normal 25% to 30% thereof. The carbides adjuvant is added in an amount to provide fuel to maintain the steel-tapping temperature at the desired level with the amount of scrap being added. As an example of the use of the composition according to the present invention, a self-fluxing mixture of 5 parts by weight of calcium carbide of particle sizes passing ¼ inch by down and 1 part by weight of silicon carbide of particle sizes ⅜ inch by down prepared as described above is fed to an oxygen steel converter, i.e. an L–D furnace, in an amount to provide 40 lbs. calcium carbide and 8 lbs. silicon carbide, per ton of steel produced, being charged to the furnace with an amount of scrap metal. There is charged in this instance 40% of scrap metal based on the total weight of the hot metal plus scrap whereas only 30% scrap would be used herein in the absence of the added carbides. Oxygen blowing is carried out with sufficient extra oxygen to react with added carbides, to produce a heat of steel at the desired tapping temperature and carbon content. In another mode of using the composition according to this invention there are employed 1 part by weight of minus ¼ inch calcium carbide and 1 part by weight of silicon carbide of minus ⅜ inch particles and in total amounts, respectively, to provide 17 lbs. of each carbide per ton of steel produced, particularly in treating a low-silicon hot metal starting charge. In this latter instance, sufficient lime is provided in the flux charge to react with the excess silicon produced by oxidation of the silicon carbide in the furnace operation over that satisfied by the added Ca carbide and to provide the proper slag V-ratio.

In the admixture consisting essentially of calcium carbide and silicon carbide as described hereinabove, there can also be admixed a small amount up to about 35% by weight of the total admixture of powdered aluminum metal as a fuel and which also undergoes exothermic oxidation during the oxygen blowing step and is believed to form alumina useful as a slag component. There can be incorporated, alternatively or additionally, a minor amount of iron ore, millscale, fluorspar, bauxite or other desired additive compatible in the oxygen steel-making process or any suitable combination thereof, and the amount added, including any powdered aluminum metal, will not exceed about 35% of the total admixture.

It is an advantage of the present invention that greatly increased fuel values are incorporated in the oxygen furnace charge and that therefore the amount of scrap which can be charged in one blow is greatly increased over the normal amount of scrap charged. The components of the furnace adjuvants described herein are all compatible with the furnace charge in the molten metal and provide on the one hand fluxing and slag components, that is lime and silica, and on the other hand gaseous components, carbon oxide gases, which go off with the other furnace gases. The tar or pitch bond or a combustible container adds still further fuel in this operation. It is a great advantage that the carbide materials can be widely distributed over the molten metal charge and are in such physical state that they do not blow out of the furnace, particularly the calcium carbide which is of relatively slow solubility rate in the molten metal. By the present invention, the calcium carbide is more readily available for reaction because of its small size and it is retained in the furnace zone where needed for reaction because of the physical state wherein it is added. It is an advantage over blowing calcium carbide into a hot metal bath that by the present method no additional inert carrier gas is required and the calcium carbide is well distributed through the hot metal. On the other hand, when added by means of an inert gas stream, it is fed in at the top of the melt and in one restricted area, being necessarily distributed therefrom by the stirring or turbulence in the metal bath. By the present method and means the calcium carbide is well distributed over the bath and solubilization therein is enhanced. It is believed a further advantage that the silicon carbide dissolves more readily and thereupon enhances the rate of solubility of the calcium carbide in the hot metal. It is believed also that this effect may result from increased temperature of the hot metal bath because of rapid oxidation of the silicon carbide, which is an exothermic reaction.

Although in the above specific description the carbide adjuvant composition has been placed in the converter with the scrap, it will be understod that any other desired sequence of charging can be employed. Thus, there can be charged in sequence, scrap, carbides, hot metal, then fluxes; or scrap, hot metal, carbides and fluxes; or scrap, hot metal, fluxes and carbides. In each type of operation oxygen blowing is suitably started after charging of the hot metal. In this description the added metallic coolant described has been scrap metal but it is to be understood that "scrap" or "scrap metal" is intended to include other metallic coolants such as millscale, cold pig iron, iron ore, ore sinter or the like, Percentages herein are by weight unless otherwise indicated; and mesh sizes are Tyler screen sizes. Aluminum metal cans or containers can be used instead of sheet steel cans.

Having now described the invention,
What is claimed is:

1. A composition adapted to charging to an oxygen steel-making furnace which consists essentially of a granular admixture of from 5% to 95% by weight silicon carbide and from 95% to 5% by weight calcium carbide, said weights being based on the total weight of said carbides.

2. A composition as in claim 1 wherein said calcium carbide is of particle size passing through ¼ inch mesh.

3. A composition as in claim 1 wherein said silicon carbide is of particle size passing through ½ inch mesh.

4. A composition as in claim 1 wherein silicon carbide is present in an amount of 30% to 70% and calcium carbide in an amount of 70% to 30%, both amounts being by weight of the total carbide content.

5. A composition as in claim 1 consisting essentially of about 5 parts by weight calcium carbide and 1 part by weight silicon carbide.

6. A shaped feed adapted to charging to an oxygen steel-making zone to provide fuel and slag-forming components therein comprising an admixture of
   (a) a carbide component consisting essentially of 5% to 95% granular silicon carbide and 95% to 5% granular calcium carbide, by weight based on total weight of carbides, said calcium carbide being of smaller average particle size than said silicon carbide, and
   (b) a minor amount of a water-repellent hydrocarbon bonding agent at least semi-solid at room temperature.

7. Shaped feed as in claim 6 wherein said silicon carbide is present in an amount of about 1 part by weight and said calcium carbide is present in an amount of about 5 parts by weight.

8. Composition as in claim 6 wherein silicon carbide is of particle sizes passing ½ inch mesh and said calcium carbide is of particle sizes passing ¼ inch mesh.

9. Shaped feed as in claim 6 containing from 2% to 20% of a bonding agent chosen from the group consisting of tar and pitch, based on total weight of the admixture.

10. A composition adapted to charging to an oxygen steel-making furnace to provide fuel and slag components which consists essentially of an admixture of silicon carbide, calcium carbide and powered aluminum metal, wherein said carbides are present in an amount of from 5% to 95% silicon carbide and from 95% to 5% calcium carbide based on total weight of carbides, and said aluminum is present in a small amount up to 35% of said admixture, all said percentages being by weight.

References Cited
UNITED STATES PATENTS

| | | | |
|---|---|---|---|
| 2,785,970 | 3/1957 | Loria | 75—58 |
| 3,051,564 | 8/1962 | Drenning | 75—53 |
| 3,197,306 | 7/1965 | Osborn | 75—53 X |
| 3,231,368 | 1/1966 | Watson | 75—58 |

L. DEWAYNE RUTLEDGE, Primary Examiner

J. E. LEGRU, Assistant Examiner

U.S. Cl. X.R.

75—53; 106—44